United States Patent [19]

Ninomiya et al.

[11] Patent Number: 4,521,486
[45] Date of Patent: Jun. 4, 1985

[54] MAGNETIC RECORDING MEDIUM

[75] Inventors: Yoshinobu Ninomiya, Naruse; Masashi Somezawa, Sendai; Akira Hashimoto, Tagajyo, all of Japan

[73] Assignee: Sony Corporation, Tokyo, Japan

[21] Appl. No.: 396,302

[22] Filed: Jul. 8, 1982

[30] Foreign Application Priority Data

Jul. 13, 1981 [JP] Japan .................. 56-109129

[51] Int. Cl.$^3$ .............................. G11B 5/68
[52] U.S. Cl. .................. 428/407; 252/62.54; 360/134; 360/135; 360/136; 427/128; 427/131; 428/425.9; 428/694; 428/695; 428/900
[58] Field of Search .......... 428/694, 695, 900, 425.9, 428/407; 427/44, 54.1, 128, 131; 252/62.54; 360/134–136

[56] References Cited

U.S. PATENT DOCUMENTS 4,004,997 1/1977 Tsukamoto .............. 428/425.9
4,404,253 9/1983 Kohler ..................... 428/694
4,407,901 10/1983 Miyatsuka .................. 428/407

FOREIGN PATENT DOCUMENTS 54-147811 11/1979 Japan .
2054622 2/1981 United Kingdom .

Primary Examiner—Ellis P. Robinson
Attorney, Agent, or Firm—Hill, Van Santen, Steadman & Simpson

[57] ABSTRACT

The magnetic recording medium comprises a non-magnetic substrate and a magnetic layer formed thereon composed mainly of magnetic powder and a binder. The binder contains a binder component having an absorbed amount of the binder component to a surface of the magnetic powder more than 1.5 mg per square meter of a surface area of the powder measured in 3 weight % solution in methyl ethyl ketone solvent, and the magnetic layer has a pigment volume concentration of the magnetic powder between 60 and 75%.

The binder provides an improved strength and high pigment volume concentration of magnetic coating layer, and improved durability of the magnetic recording medium.

6 Claims, 2 Drawing Figures

MAGNETIC RECORDING MEDIUM

BACKGROUND OF THE INVENTION

1. Field of the Invention

The present invention relates to a magnetic recording medium and, more particularly, to a magnetic recording medium having a coating layer composed mainly of an acicular magnetic powder and a binder having improved properties.

2. Description of the Prior Art

A magnetic recording medium has a magnetic coating layer which is formed on a non-magnetic substrate and which mainly consists of magnetic powder and a binder. When the magnetic characteristics of the magnetic recording medium are considered, they are considered to increase as the volume concentration of the magnetic powder in the magnetic coating layer increases. However, in practice, the magnetic coating layer is considered as a composite material of a binder, magnetic powder and so on and must have a certain strength. Therefore, a critical pigment volume concentration exists at which the strength of the magnetic coating layer becomes maximum. If the concentration of the pigment exceeds this critical pigment volume concentration, the binding force between the magnetic powder and the binder is generally weakened. If the magnetic recording medium in this state is used for recording/reproduction, the magnetic powder may peel off due to contact with a magnetic transducer head or tape guides, or the magnetic coating layer may be damaged or peeled off by a rotary head or a rotary drum. Then, the medium may not be put to use again.

A conventional binder is not sufficient in the binding force with the magnetic powder and provides the critical pigment volume concentration which is as low as 45 to 55%.

In order that a magnetic recording medium have excellent magnetic characteristics and electromagnetic transducing characteristics, the magnetic powder must be homogeneously dispersed within the magnetic coating layer. However, in the conventional magnetic recording media, dispersion of the magnetic powder is not necessarily satisfactory. For this reason, a dispersion agent is used to facilitate dispersion. When a dispersion agent is used, it is adsorbed in the magnetic powder to render its surface lipophilic. Then, the dispersibility of the mangetic powder in an organic solvent is improved and the orientation is facilitated, providing a magnetic recording medium with excellent magnetic characteristics or the like.

The lipophilic group of a surface active agent used as the dispersion agent, a typical example of which is an alkyl group having 7 to 21 carbon atoms, has a low surface energy and provides unsatisfactory binding force with the binder. Therefore, the critical pigment volume concentration at which the strength of the magnetic coating layer becomes maximum is 45 to 55% which is not satisfactory.

OBJECTS AND SUMMARY OF THE INVENTION

It is an object of the present invention to provide an improved magnetic recording medium.

It is another object of the present invention to provide a magnetic recording medium in which a magnetic coating layer has an improved strength.

It is further object of the present invention to provide a magnetic recording medium in which a magnetic coating layer contains high pigment volume concentration.

It is still further object of the present invention to provide a magnetic recording medium having an improved durability.

According to an aspect of the present invention, there is provided a magnetic recording medium comprising a non-magnetic substrate and a magnetic layer formed thereon composed mainly of magnetic powder and a binder, the binder containing a binder component having an adsorbed amount of the binder component to a surface of the magnetic powder more than 1.5 mg per square meter of a surface area of the powder measured in 3 weight % solution in methyl ethyl ketone solvent, and the magnetic layer having a pigment volume concentration of the magnetic powder between 60 and 75%.

DETAILED DESCRIPTION OF THE PREFERRED EMBODIMENTS

Figure 1:
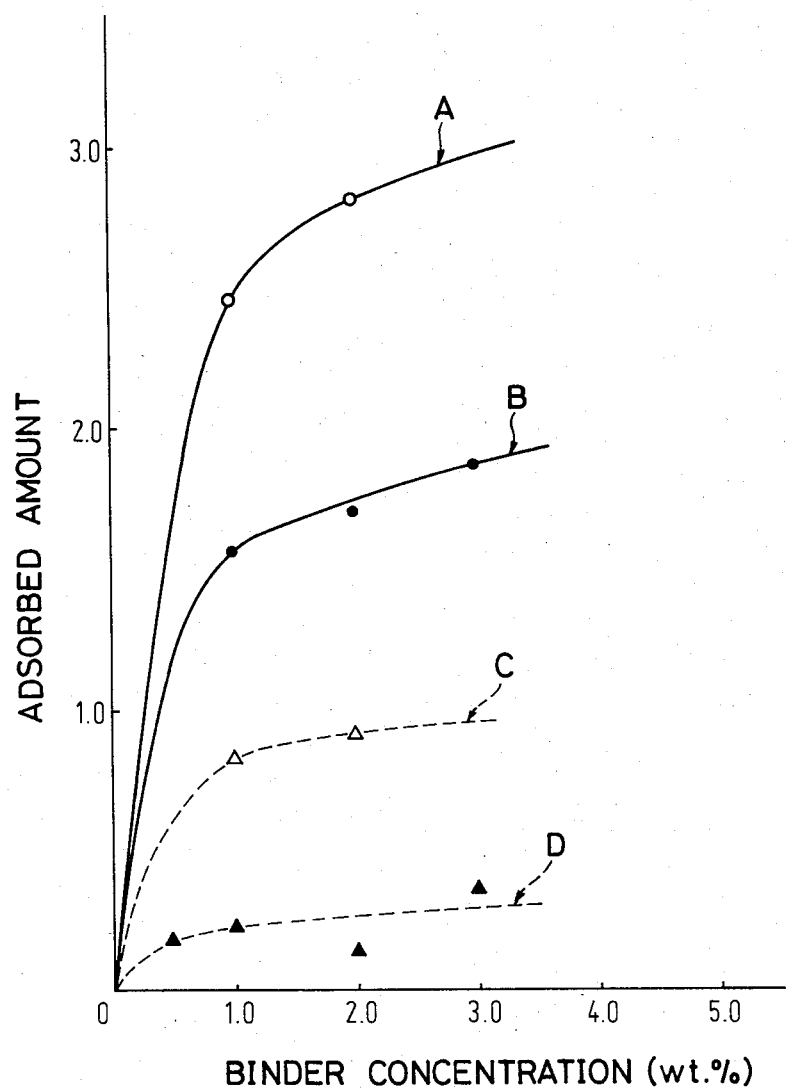
FIG. 1 is a graph showing the adsorbed amount as a function of the binder concentration.

A magnetic recording medium with a magnetic coating layer having high magnetic powder volume concentration will now be described below.

It has been found that a binder with a great binding force is preferred to increase the magnetic powder volume concentration. According to the present invention, a pigment volume concentration of about 60 to 75% is obtained and the strength and durability of the magnetic coating layer are significantly improved, if a binder is used such that the adsorbed amount of the binder into the magnetic powder is not less than about 1.5 mg per square meter of the surface area of the magnetic powder in a 3% (by weight) methyl ethyl ketone solution at 25° C.

Accordingly, the binder which may be used in the present invention is not particularly limited as long as it satisfies the conditions as described above. However, the preferred examples of the binder may include thermoplastic polyurethane resin; and polyesters or polyurethanes having hydrophilic groups such as a sulfonic group and a sulfonic salt group.

The thermoplastic polyurethane resin as described above may include a long chain diol having a molecular weight in a range of about 500 to 3,000, an organic diisocyanate, a short chain triol having a molecular weight in a range lower than about 500, and optionally a short chain diol having a molecular weight in a range of 50 to 500.

The long chain diol to be employed for the termoplastic polyurethane resin has a molecular weight in the range from about 500 to 3,000 and may include, for example, a polyester diol, a polyether diol, a polyether ether glycol and the like. The polyester diol may include, for example, a polyester diol obtainable by the reaction of an aliphatic dicarboxylic acid such as succinic acid, adipic acid, sebacic acid, azelaic acid or the like; an aromatic dicarboxylic acid such as terephthalic acid, isophthalic acid or the like; a lower alcohol ester such as methyl or ethyl ester, of the carboxylic acid with an alkane diol such as ethylene glycol, 1,3-propylene glycol, 1,4-butylene glycol, 1,6-hexane glycol, diethylene glycol, neopentyl glycol or the like, a polyalkylene glycol such as dipropylene glycol, ditrimethylene glycol or the like, an ethylene oxide adduct or a propylene oxide adduct, of bisphenol A or the like or a mixture thereof; and a polyester diol of the lactone type obtained by the cleavage polymerization of a lactone such as ε-caprolactone or the like. The polyether diol may include, for example, a polyalkylene ether glycol such as polyethylene glycol, polypropylene ether glycol, polytetramethylene ether glycol or the like, and a polyether glycol obtainable by the copolymerization of these glycols. The polyether ester glycol may include, for example, a polyester ether glycol obtainable by the reaction of the aforesaid polyalkylene ether glycol with an aliphatic or aromatic dicarboxylic acid as hereinabove enumerated as the polyol component.

The organic diisocyanate to be used for the thermoplastic polyurethane resin may include, for example, an aromatic diisocyanate, an aliphatic diisocyanate or an alicyclic diisocyanate such as tolylene diisocyanate, 4,4′-diphenylmethane diisocyanate, paraxylene diisocyanate, 1,6-hexamethylene diisocyanate, isophorone diisocyanate or the like. The diisocyanates may be employed singly or in admixture with each other.

Further, the short chain triol having a molecular weight in a range lower than about 500 to be used for manufacturing the thermoplastic polyurethane resin is represented by formula (I):

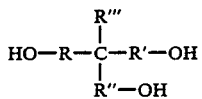

or by formula (II):

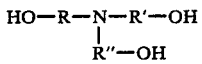

[where R is a group represented by the formula:

(where m and n are each an integer from 0 to 6, provided that, when one of m and n is 0, the other is an integer other than 0);

R′ is a group represented by the formula:

(where p and q are each an integer from 0 to 6, provided that, when one of p and q is 0, the other is an integer other than 0);

R″ is a group represented by the formula:

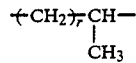

(where r is an integer from 0 to 3) or a group represented by the formula:

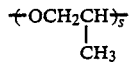

(where s has the same meaning as above); and R‴ is a group represented by the formula:

$$-C_t H_{2t+1}$$

(where t is an integer from 0 to 4)].

The short chain triol represented by formula (I) may be enumerated, for example, by the following compounds: glycerine, ethylene oxide adduct of glycerine (having a 2-hydroxyethyl group at both terminals of the hydroxyl groups or a 2-hydroxyethyl group at one of the terminals and a 2-hydroxyethyloxyethyl group at the other thereof), 2-methylpropane-1,2,3-triol, 4-[bis(2-hydroxyethyl)]-2-hydroxypentane, 3-methylpentane-1,3,5-triol, 1,2,6-hexanetriol or the like. As the triols represented by formula (II), there may be enumerated, for example, by the following compounds: 1-bis(2-hydroxyethyl)amino-2-propanol (N-isopropanol diethanol-amine), propylene oxide adduct of diethanolamine (N-2-(2-hydroxy)propyloxy-propyldiethanolamine), ethylene oxide adduct of N-isopropanoldiethanolamine, or the like.

The short chain diol to be optionally used for the thermoplastic polyurethane resin has a molecular weight in the range from about 50 to 500 and may include, for example, an aliphatic glycol such as ethylene glycol, propylene glycol, 1,4-butylene glycol, 1,6-hexane glycol, neopentyl glycol or the like; or an aromatic diol such as ethylene oxide adduct or propylene oxide adduct of bisphenol A, ethylene oxide adduct of hydroquinone, or the like. The short chain diol may be used singly or in admixture with each other in accordance with desired properties on the thermoplastic polyurethane resin. The employment of the short chain diol can provide desired properties on the resulting thermoplastic polyurethane resin to a greater extent when employed in the ratios as specified hereinabove.

The thermoplastic polyurethane resin in accordance with the present invention is obtainable by the polyaddition reaction of the long chain diol having a molcular weight in a range of about 500 to 3,000, the organic diisocyanate and the short chain triol having a molecular weight in a range lower than about 500 to be represented by formula (I) or (II) described above and, as desired, the short chain diol having a molecular weight in a range of about 50 to 500.

(A) $\frac{1}{2} \leq b - (a+d)/c < 1$
(B) $1 < b/(a+d) < 3$
(C) $d/a \leq 3$ (where a is a molar number of the long chain diol; b is a molar number of the organic diisocyanate; c is a molar number of the short chain triol; and d is a molar number of the short chain diol).

The polyester of another example of the present invention may include a hydrophilic group such as a sulfonic salt group to be represented by a —SO$_3$M group or the like (where M is a hydrogen atom or alkaline metal atoms). The alkaline metal atom may include, for example, lithium, sodium, or potassium atoms. The polyester having a sulfonic salt group may include, for example, an unsaturated aliphatic dicarboxylic acid such as maleic acid anhydride, fumaric acid, itaconic acid, citraconic acid or the like, a saturated aliphatic dicarboxylic acid such as succinic acid, adipic acid, azelaic acid, sebacic acid, dodecanoic dicarboxylic acid or the like, a saturated aromatic dicarboxylic acid such as phthalic acid, isophthalic acid, therephthalic acid or the like, the aliphatic diols such as methyleneglycol, ethylene glycol, propylene glycol, trimethylene glycol, butylene glycol, pentyl glycol, neopentyl glycol, hexylglycol or the like, the polyaliphatic diols such as diethylene glycol, dipropylene glycol, triethylene glycol, or the like, the triols such as glycerine, butanetriol, trimethylol propane or the like, the tetraols such as pentaerythritol, diglycerine or the like, the alicyclic diols such as cyclohexane diol, 1,4-dimethyl-1,4-cyclohexane diol, 1-cyclohexane diol or the like, the aromatic triols such as catechol, resorcinol, hydroquinone, 4-chlororesorcinol, methyl-hydroquinone, phyrogallol, 1,2,4-benzenetriol, phloroglucinol or the like, or the aromatic ring type aliphatic polyol such as 1,4-cyclohexane dimethanol, 3-cyclohexane-1,1-dimethanol, hydroxybenzylalcohol, or the like.

Further, the polyurethane diol of another example of the present invention may include a hydrophilic group such as a sulfonic salt group to be represented by a —SO$_3$M group or the like (where M has the same meaning as described above). The polyurethane diol may be obtainable by the polyaddition reaction of the aromatic diisocyanate such as hexamethylene diisocyanate, tetramethylene diisocyanate or the like, or the aromatic diisocyanate such as trilene diisocyanate, diphenylmethane-4,4'-diisocyanate or the like with the aforesaid polyol.

Among the polyesters or polyurethanes containing hydrophilic groups enumerated above, so-called radiation curing type polyesters or polyurethanes which have at least two radiation reactive double bonds may be used. The radiation reactive double bond is preferably a non-carboxylic group of an acid or an acid amide, an acid residue or an acid amide residue having a double bond at its terminal, such as CH$_2$=CHCOO—,

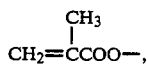

CH$_2$=CHCH$_2$COO—,    CH$_2$=CHCH$_2$—CH$_2$CH$_2$COO—,

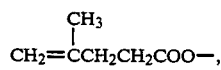

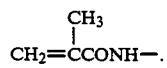

The polyesters and polyurethanes having molecular weights of about 200 to 50,000 per hydrophilic group are particularly preferable.

In the polyesters or polyurethanes containing sulfonic salt groups as hydrophilic groups as described above, the sulfonic salt groups are preferable contained in the amount of about 0.01 to 2.0 mmol/g in the molecules.

According to the present invention, a binder, wherein the adsorbed amount into the magnetic powder in a 3% methyl ethyl ketone solution at 25° C. is not less than about 1.5 mg/m$^2$ of the surface area of the magnetic powder, is preferably contained in the amount of at least about 20% by weight of the total binder content.

Even if the binder having an adsorbed amount of 1.5 mg/m$^2$ or more is used, the still characteristics or noise due to sliding movement tend to be caused if the pigment volume concentration in the magnetic coating layer is set to be not more than about 60% as in the prior art. This is considered to be attributable to the fact that, if the pigment volume concentration is at a low level, the individual magnetic powder particles are completely surrounded by the binder to weaken the stregth at the surface of the magnetic coating layer, and vibrations tend to be caused upon contact with the magnetic head due to the relatively big binder components at the surface of the magnetic coating layer. If a binder has an adsorbed amount of not more than about 1.5 mg/m$^2$ and a high pigment volume concentration due to a high P/B ratio, electomagnetic transducing characteristics of the resultant magnetic recording tape are indeed improved. However, such a magnetic recording tape have physical drawbacks such as an increase in the amount of powder rubbed off and a decrease in the peeling strength.

Another binder may also be added in a predetermined amount in addition to the binder as described above. The binder to be used with the magnetic or magnetizable powders in accordance with the present invention may be any resinous binder and may include, for exmple, vinyl chloride-vinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-styrene copolymer, thermoplastic polyurethane resin other than those described bove, phenoxy resin, polyvinyl fluoride, vinylidene chloride-acrylonitrile copolymer, butadiene-acrylonitrile copolymer, acrylonitrile-butadiene-acrylic acid copolymer, acrylonitrile-butadiene-methacrylic acid copolymer, polyvinyl butyral, cellulose derivatives, styrene-butadiene copolymer, polyester resin which does not have the hydrophilic groups as described above, phenol resin, epoxy resin, thermosetting polyurethane resin, urea resin, melamine resin, alkyd resin, urea-formaldehyde resin, or mixtures thereof. A compound having two or more of acrylic double bonds in a molecular and a molecular weight in a range more than 400 may be used as a binder.

Magnetic or magnetizable powders or particles to be employed in a magnetic layer on magnetic recoridng media in accordance with the present invention may be of any known type and may include, for example, gamma-Fe$_2$O$_3$, Fe$_3$O$_4$, a mixture of gamma-Fe$_2$O$_3$ with Fe$_3$O$_4$, cobalt-doped gamma-Fe$_2$O$_3$ or Fe$_3$O$_4$, CrO$_2$, barium ferrite, Berthollide compound or ferromagnetic alloy particles such as Fe-Co, Co-Ni, Fe-Co-Ni, Fe-Co-B, Fe-Co-Cr-B, Mn-Bi, Mn-Al or Fe-Co-V, iron nitride or the like. A reinforcement material capable of being used in the magnetic layer of the magnetic recording medium in accordance with the present invention may include, for example, aluminum oxide, chromium oxide, silicon oxide or mixtures thereof. Magnetic recording media produced in accordance with the present invention may also contain a lubricant such as squalane, an antistatic agent such as carbon black and a dispersion agent such as lecithin. The components of the magnetic coating layer are dissolved in an organic solvent to prepare a magnetic paint and the paint is applied on the substrate. An organic solvent to be used with the magnetic or magnetizable particles or powders and the binder may include, for example, ketones such as acetone, methyl ethyl ketone, methyl isobutyl ketone, cyclo-hexanone or the like; alocohols such as methanol, ethanol, propanol, butanol or the like; esters such as methyl acetate, ehtyl acetate, butyl acetate, ethyl lactate, glycol diacetate, monoethyl ether or the like; glycol ethers such as ethylene glycol dimethyl ether, ethylene glycol monoethyl ether, dioxane or the like; aromatic hydrocarbons such as benzene, toluene, xylene or the like; aliphatic hydrocarbons such as hexane, heptane or the like; nitropropane; mixtures thereof or with other suitable organic solvents. The non-magnetic substrate to be used in accordance with the present invention may include, for example, polyesters such as polyethylene terephthalate or the like; polyolefins such as polypropylene or the like; cellulose derivatives such as cellulose triacetate, cellulose diacetate or the like; polymers such as polycarbonate, polyvinyl chloride, polyimide, polyamide, polyhydric acid or the like; metals such as aluminum, copper or the like; papers; or any other suitable material.

The binder which satisfies the conditions described above and has the adsorbed amount of about 1.5 mg/m$^2$ or more is used in the present invention. As a result, coating strength of the magnetic layer and the durability of the magnetic recording medium are significantly improved.

The present invention will be described more in detail by way of following examples.

ethyl ketone to give a polyurethane resin solution having a 35% solid content, a viscosity of 17,600 cp/25° C. and an OH value of 0.06 mmol/g. The polyurethane resin obtained had the adsorbed amount of 2.0 mg/m$^2$ to an iron oxide surface in a 3% (by weight) methyl ethyl ketone solution at 25° C.

A magnetic paint having the following composition was prepared as follows:

| Composition | Amount (parts by weight) |
| --- | --- |
| Co—doped gamma-Fe$_2$O$_3$ (surface area 27 m$^2$/g; specific gravity 5.0; σ0.75 emu/g; Hc 6500e) | 100 |
| polyurethane resin (100% solid content specific gravity 1.20) | 12.5 |
| Butyl Stearate | 1 |
| Cr$_2$O$_3$ | 5 |
| Olive oil | 1 |
| Methyl ethyl ketone-methyl isobutyl ketone-toluene (1:1:1) | 170 |

The mixture of the above composition was milled in a ball mill for 48 hours, and was filtered with a filter havng 1μ mesh. After adding 2 parts by weight of "Dismodule L" as a curing agent and stirring the mixture, the resultant magnetic paint was coated to a thickness of 5.5 microns on a polyester film having a thickness of 16 microns. After being subjected to super calendering, the film was cut into halves to provide magnetic recording tape. The magnetic recording tape obtained had a pigment volume concentration of 66%.

Various characteristics of the magnetic recording tape are shown in Table 1.

TABLE 1

| | Binder (parts by weight) | Pigment Volume Concentration (%) (P/B ratio) | Characteristics | | | | | |
| --- | --- | --- | --- | --- | --- | --- | --- | --- |
| | | | Rs (%) | Output (db) | Still (min) | Amounts of* Rubbed-Off Powder | Peeling Strength (g) | Sliding Noise (db) |
| Example 1 | 12.5 | 67 (8) | 82 | +2 | 1000 | −1.0 | 30 | 2.5 |
| Example 2 | 10 | 71 (10) | 81 | +2 | 1200 | −1.5 | 30 | 2.0 |
| Example 3 | 16.6 | 60 (6) | 82 | +1.5 | 200 | −0.5 | 35 | 4.0 |
| Example 4 | 12.5 | 67 (8) | 81 | +1.5 | 800 | −1.5 | 50 | 2.0 |
| Comparative Example 1 | 20 | 55 (5) | 83 | +1.0 | 60 | −0.5 | 40 | 6 |
| Comparative Example 2 | 25 | 50 (4) | 83 | +0.5 | 20~30 | −0.5 | 40 | 8 |
| Comparative Example 3 | 6.25 | 80 (16) | 76 | −1.0 | 30 | −5.0 | 20 | 8 |
| Comparative Example 4 | 12.5 | 67 (8) | 65 | 0 | 30 | −5.0 | 80 | ~4 |

*The amount of rubbed-off powder was measured with pressure-sensitive adhesive tape and was estimated by demerit mark system.

EXAMPLE 1

A polyurethane resin was prepared in the following manner as a binder for the mangetic recording tape. A 5,000-ml reaction vessel equipped with a stirring propeller, a thermometer and a condenser was charged with 1,000 grams (0.5 mole) of ethylene adipate having a molecular weight of 2,000 and 217.5 grams (1.25 moles) of tolylene diisocyanate ("T-80"; manufactured and sold by Nippon Polyurethane Kogyo K.K.), and the mixture was reacted at 80° to 90° C. for 3 hours. To the mixture were then added 1,200 grams of methyl ehtyl ketone, 900 grams of toluene and 71.4 grams (0.78 mole) of glycerine and 0.1 gram of dibutyltin dilaurate, and the chain prolongation was effected at 60° to 70° C. To the reaction mixture was added 290 grams of methyl

EXAMPLES 2 & 3

The procedures of Example 1 were followed with the exception that the polyurethane resin was used in the amounts of 10 and 16.6 parts by weight. The magnetic recording tapes wherein the pigment volume concentration remained within the range of the present invention were obtained. Various properies of these magnetic recording tapes are also shown in Table 1.

EXAMPLE 4

The procedures of Example 1 were followed to prepare a magnetic recording tape with the exception that the binder consisting of 50% by weight of the polyurethane resin as described above and 50% by weight of a known polyurethane resin ("N-2304"; manufactured and sold by Nippon Polyurethane Kogyo K.K.) was added in the amount of 12.5% by weight.

COMPARATIVE EXAMPLES 1 to 3

The procedures of Example 1 were followed to prepare mangetic recording tapes with the exception that the binder was used in the amounts of 20, 25 and 6.25 parts by weight, respectively. The resultant magnetic recording tapes had the pigment volume concentrations as shown in Table 1 which fall outside the range defined by the present invention.

COMPARATIVE EXAMPLE 4

A known polyurethane resin having an adsorbed amount of 1 mg/m$^2$ ("N-2304"; manufactured and sold by Nippon Polyurethane Kogyo K.K.) was mixed with a vinyl choloride-vinyl acetate copolymer in the mixing ratio of 1:1 to increase the pigment volume concentration. The procedures of Example 1 were followed to prepare a magnetic recording tape using this magnetic paint.

Various characteristics of the magnetic recording tapes prepared in the respective Comparative Exmples were measured and are shown in Table 1.

EXAMPLE 5

The procedures of Example 1 were followed to prepare magnetic recording tapes while varying the amount of the binder. The resultant magnetic recording tapes all had a pigment volume concentration of 67%. The Rs values of the magnetic recording tapes are shown in Table 2.

Amounts in Table 2 are amounts (in wt. %) of the thermoplastic polyurethane resin in Example 4.

TABLE 2

| Amount (%) | 10 | 20 | 30 | 60 | 70 | 100 |
|---|---|---|---|---|---|---|
| Rs (%) | 70 | 75 | 78 | 82 | 82 | 82 |

METHOD OF ADSORPTION TEST

The adsorbed amounts of the binders were measured in the manner to be described below.

50 grams each of the binder solutions of various concentrations were prepared in polyethylene bottles having a capacity of 100 cc. After pouring the mixture of a predetermined composition into the bottle, a steel ball having a diameter of 6 mm and a weight of 100 grams was placed in the bottle and was milled for 8 hours to be dissolved. 15 grams of magnetic powder were added and the mixture was stirred for 24 hours. The solution to which the magnetic powder was added for treatment was left to stand for 16 hours after stirring and was then centrifuged for 30 minutes. The concentration of the supernatant liquid was measured by the dry weight method. The adsorbed amount was determined from the concentration difference between that of the supernatant liquid and that of the solution before mixing with the magnetic powder.

FIG. 1 shows the adsorbed amount as a function of the binder concentration. Each binder was dissolved in a solvent (methyl ethyl ketone) in a predetermined concentration and was measured for its adsorbed amount using gamma-Fe$_2$O$_3$ having a specific surface area of 22.9 m$^2$/g. Referring to FIG. 1, curve A represents the case of a thermoplastic polyurethane resin (having a number average molecular weight of 50,000, a weight average molecular weight of 90,000, and an OH value of 0.76 mmol/g, and a tertiary amine group content of 0.76 mmol/g) prepared from 0.50 mole of hexane adipape having a molecular weight of 2,500, 1.45 moles of 1,6-hexamethylene diisocyanate, and 1.18 moles of N-isopropanol diethanolamine, and curve B represents the case of Example 2. Curves C and D represent the cases of known polyurethane resins ("N-2304" and "N-2023"/manufactured and sold by Nippon Polyurethane Kogyo K.K.).

Figure 2:
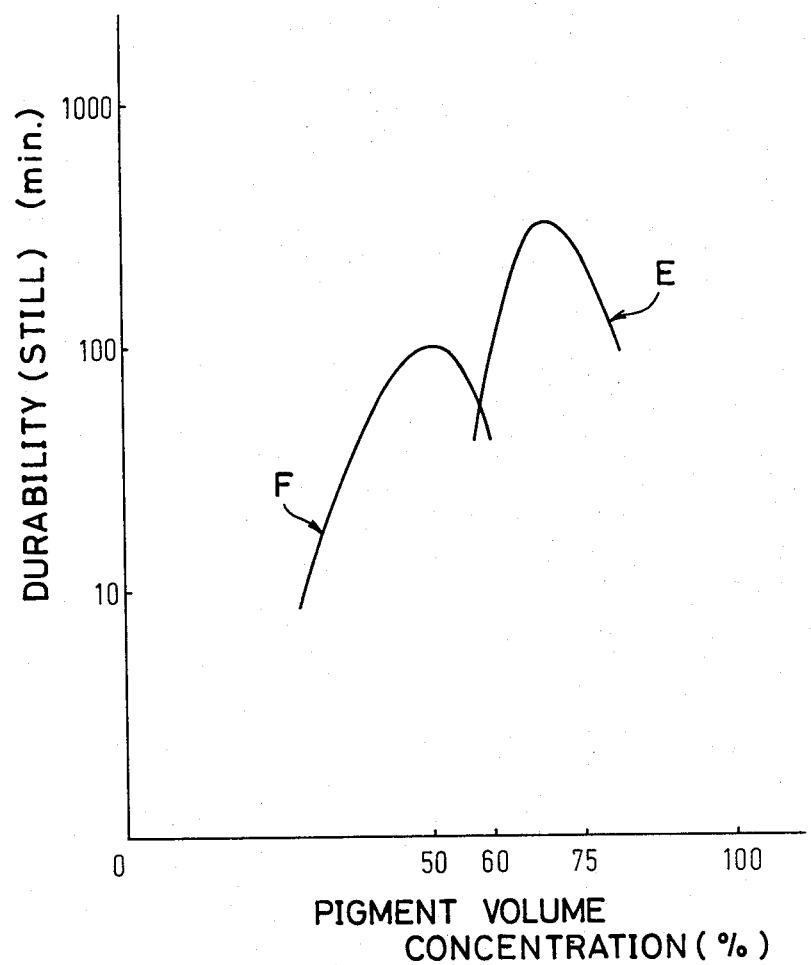
FIG. 2 is a graph showing the durability (still time, i.e., retaining time of still playback picture) as a function of the pigment volume concentration.

FIG. 2 shows the durability (still time) of the termoplastic polyurethane resins (adsorbed amount: 20 mg/m$^2$) of Example 1 and of Comparative Example 4 as a function of pigment volume concentration. Referring to FIG. 2, curve E corresponds to Example 1, while curve F corresponds to Comparative Example 4.

What is claimed is:

1. A magnetic recording medium comprising a nonmagnetic substrate and a magnetic layer formed thereon composed mainly of magnetic powder and a binder, said binder containing a binder component being adsorbed on a surface of said magnetic powder in an amount more than 1.5 mg per square meter of the surface area of said powder measured in 3 weight % solution in methyl ethyl ketone solvent, and said magnetic layer having a pigment volume concentration of said magnetic powder between 60 and 75%.

2. A magnetic recording medium according to claim 1, in which said binder component is more than 20 weight % of total amount of said binder.

3. A magnetic recording medium according to claim 1, in which said binder component is polyurethane resin or polyurethane resin having a hydrophilic group in the molecule of said resins.

4. A magnetic recording medium according to claim 3, in which said hydrophilic group is a sulfonic group or sulfonic salt group.

5. A magnetic recording medium according to claim 3, in which said hydrophilic group is contained in said resin in an amount between 0.01 and 2.0 mmol/g.

6. A magnetic recording medium according to claim 1, in which said binder component is polyurethane resin having more than 2 hydroxy groups in one molecule.

* * * * *